(12) United States Patent
Lin et al.

(10) Patent No.: US 9,247,538 B2
(45) Date of Patent: *Jan. 26, 2016

(54) SHARING FREQUENCIES IN AN OFDM-BASED WIRELESS COMMUNICATION SYSTEM

(71) Applicant: International Business Machines Corporation, Armonk, NY (US)

(72) Inventors: Yong Hua Lin, Haidian (CN); Jianbin Tang, Haidian (CN); Qing Wang, Beijing (CN); Jun Song Wang, Beijing (CN); Rong Yan, Beijing (CN); Hai Zhan, Beijing (CN); Chao Zhu, Beijing (CN); Zhen Bo Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/800,154

(22) Filed: Jul. 15, 2015

(65) Prior Publication Data

US 2015/0319740 A1 Nov. 5, 2015

Related U.S. Application Data

(63) Continuation of application No. 13/758,134, filed on Feb. 4, 2013, which is a continuation of application No. 13/537,600, filed on Jun. 29, 2012.

(30) Foreign Application Priority Data

Jun. 30, 2011 (CN) .......................... 2011 1 0189849

(51) Int. Cl.
*H04W 72/04* (2009.01)
*H04W 72/00* (2009.01)
(Continued)

(52) U.S. Cl.
CPC ............ *H04W 72/042* (2013.01); *H04W 16/14* (2013.01); *H04W 28/048* (2013.01); *H04W 72/005* (2013.01)

(58) Field of Classification Search
None
See application file for complete search history.

(56) References Cited

U.S. PATENT DOCUMENTS

| 7,710,919 B2 | 5/2010 | Woo et al. |
| 7,813,315 B2 | 10/2010 | Cleveland et al. |

(Continued)

FOREIGN PATENT DOCUMENTS

| EP | 2148546 | 1/2010 |
| EP | 2442511 | 4/2012 |

(Continued)

OTHER PUBLICATIONS

Pawekczak, P., et al. "Opportunistic Spectrum Multichannel OFDMA," Paper, Jun. 2007, pp. 5439-5444, issue 24-28.

(Continued)

*Primary Examiner* — Ayaz Sheikh
*Assistant Examiner* — Mariela Vidal Carpio
(74) *Attorney, Agent, or Firm* — Fleit Gibbons Gutman Bongini & Bianco PL; Thomas Grzesik

(57) ABSTRACT

An apparatus for sharing frequencies in an orthogonal frequency-division multiplexing OFDM-based wireless communication system, wherein the OFDM-based wireless communication system comprises a base station and a mobile device that work within a radio frequency band, the method comprising: detecting an interference signal in the radio frequency band; setting by the base station, based upon the interference signal, interference indication information in a control header of a downlink frame to be sent to the mobile device, the interference indication information indicating a frequency range that is occupied by the interference signal in the radio frequency band; and sending by the base station the downlink frame to the mobile device, such that the mobile device may, based upon the interference indication information, avoid the frequency range where the interference signal is located.

9 Claims, 5 Drawing Sheets

(51) Int. Cl.
*H04W 16/14* (2009.01)
*H04W 28/04* (2009.01)

(56) References Cited

U.S. PATENT DOCUMENTS

| | | | |
|---|---|---|---|
| 2002/0021746 A1 | 2/2002 | Schmidl et al. | |
| 2006/0019701 A1 | 1/2006 | Ji | |
| 2008/0240270 A1* | 10/2008 | Coon | H04L 5/0094 375/260 |
| 2009/0059844 A1* | 3/2009 | Ko | H04B 7/0413 370/328 |
| 2009/0109931 A1* | 4/2009 | Yin | H04W 28/06 370/335 |
| 2009/0191906 A1 | 7/2009 | Abedi | |
| 2009/0221290 A1* | 9/2009 | Kang | H04W 36/06 455/437 |
| 2009/0227255 A1 | 9/2009 | Thakare | |
| 2010/0046463 A1 | 2/2010 | Green | |
| 2010/0142463 A1 | 6/2010 | Hu | |
| 2011/0032892 A1 | 2/2011 | Bahl et al. | |
| 2011/0086651 A1 | 4/2011 | Li et al. | |
| 2011/0096703 A1 | 4/2011 | Nentwig et al. | |
| 2011/0103406 A1 | 5/2011 | Cai et al. | |
| 2011/0116500 A1 | 5/2011 | Petry et al. | |
| 2011/0299495 A1 | 12/2011 | Choi et al. | |
| 2012/0094646 A1* | 4/2012 | Hidaka | H04W 72/082 455/418 |
| 2012/0155294 A1 | 6/2012 | Park | |
| 2012/0322453 A1* | 12/2012 | Weng | H04W 72/02 455/450 |

FOREIGN PATENT DOCUMENTS

| | | |
|---|---|---|
| GB | 2450123 | 12/2008 |
| WO | 2009099289 | 8/2009 |
| WO | 2010150556 | 12/2010 |
| WO | 2011036337 | 3/2011 |

OTHER PUBLICATIONS

German Office Action dated Jul. 26, 2013 for German application No. 10 2012 211 210.3.
Foreign Examination Report for United Kingdom Application No. GB1210483.2 dated Nov. 28, 2013.
Office Action dated Nov. 8, 2013 for U.S. Appl. No. 13/537,600.
Final Office Action dated Jun. 12, 2014 for U.S. Appl. No. 13/537,600.

* cited by examiner

SHARING FREQUENCIES IN AN OFDM-BASED WIRELESS COMMUNICATION SYSTEM

CROSS-REFERENCE TO RELATED APPLICATIONS

This application is based upon and claims priority from prior U.S. patent application Ser. No. 13/758,134, filed on Feb. 4, 2013, which is based upon and claims priority from U.S. patent application Ser. No. 13/537,600, filed on Jun. 29, 2012, which in turn is based upon and claims priority from prior Chinese Patent Application No. 201110189849.4, filed on Jun. 30, 2011, the entire disclosure of each are hereby incorporated by reference in their entirety.

FIELD OF THE INVENTION

The present invention generally relates to wireless communication, and in particular, to utilization of shared radio spectrum resources.

BACKGROUND OF THE INVENTION

Radio spectrum is an important resource for wireless communication services. With the development of wireless communication wideband orientation, new technologies and new services such as WiMAX (Worldwide Interoperability for Microwave Access), LTE (Long Term Evolution), and UWB (Ultra-Wide Band) constantly emerge, and the demand on spectrum increases exponentially.

In reality, utilization of spectrum resources is imbalanced. On one hand, some unlicensed frequency bands have busy traffic and congested occupations; on the other hand, some licensed frequency bands, particularly low frequency bands that have better signal propagation features, have rather low spectrum utilization rate, and the spectrum resources are even wasted. Thus, it is quite significant to sufficiently utilize the spectrum resources and improve the spectrum resource utilization rate so as to relieve the supply-demand contradictions of spectrum resources and satisfy sustainable development of ever increasing wireless communication service applications.

One of the technologies for improving the spectrum resource utilization rate is a cognitive radio technology. The cognitive radio technology utilizes spectrum resources in a manner of opportunistic access. According to the cognitive radio technology, no spectrum resource is always occupied, while when a certain spectrum resource is not occupied, a radio communication device may take the "opportunity" to utilize this spectrum resource. In an Internet of Things (IOT) application, priority levels between mobile devices do not distinguish from one another; the opportunity for each mobile device in using a shared spectrum resource is equal; thus, adoption of the opportunistic access technology is particularly suitable for effectively utilizing the spectrum resources.

SUMMARY OF THE INVENTION

An important element for adopting opportunistic access is that the mobile device may obtain the interference indication information in the currently working radio frequency band, so as to dynamically avoid in-band interference. Thus, it may be envisaged to broadcast the in-band interference indication information to the mobile device via a base station; what is associated is that the base station broadcasts an additional data frame, which means occupying additional communication bandwidth and consuming extra energy, and also means significant modification to the existing wireless communication standard.

One of the objectives of the present invention is to broadcast the in-band interference indication information in the case of compatibility with the existing wireless communication standard, such that the mobile device may avoid in-band interference.

Therefore, according to one aspect of the present invention, there is provided a method of sharing frequencies in an orthogonal frequency-division multiplexing OFDM-based wireless communication system, wherein the OFDM-based wireless communication system comprises a base station and a mobile device that work in a radio frequency band, the method comprising; detecting an interference signal in the radio frequency band; setting by the base station, based upon the interference signal, interference indication information in a control header of a downlink frame to be sent to the mobile device, the interference indication information indicating a frequency range that is occupied by the interference signal in the radio frequency band; sending by the base station the downlink frame to the mobile device, such that the mobile device may, based upon the interference indication information, avoid the frequency range where the interference signal is located.

According to another aspect of the present invention, there is provided an apparatus for sharing frequencies in an orthogonal frequency-division multiplexing OFDM-based wireless communication system, wherein the OFDM-based wireless communication system comprises a base station and a mobile device that work in a radio frequency band, the apparatus comprising: detecting means configured to detect an interference signal in the radio frequency band; setting mans configured to set, based upon the interference signal, interference indication information in a control header of a downlink frame to be sent to the mobile device, the interference indication information indicating a frequency range that is occupied by the interference signal in the radio frequency band; and sending means, for sending the downlink frame to the mobile device, such that the mobile device may, based upon the interference indication information, avoid the frequency range where the interference signal is located.

By applying various embodiments of the present invention, the OFDM-based wireless communication system may transmit or broadcast the interference indication information through an availability bit in the control header of the downlink frame, without the necessity of generating an additional frame therefor; thus, compatibility with the existing standard may be maintained to a great extent, and meanwhile, interference from a known or unknown system in the same radio frequency band may be avoided when using the shared frequency resources, so as to guarantee communication quality and security, thereby better utilizing the spectrum resources sufficiently.

BRIEF DESCRIPTION OF THE DRAWINGS

Features, advantages, and other aspects of various embodiments of the present invention will become more apparent through the following detailed description with reference to the following drawings, in which.

DESCRIPTION OF THE PREFERRED EMBODIMENTS

Figure 1:
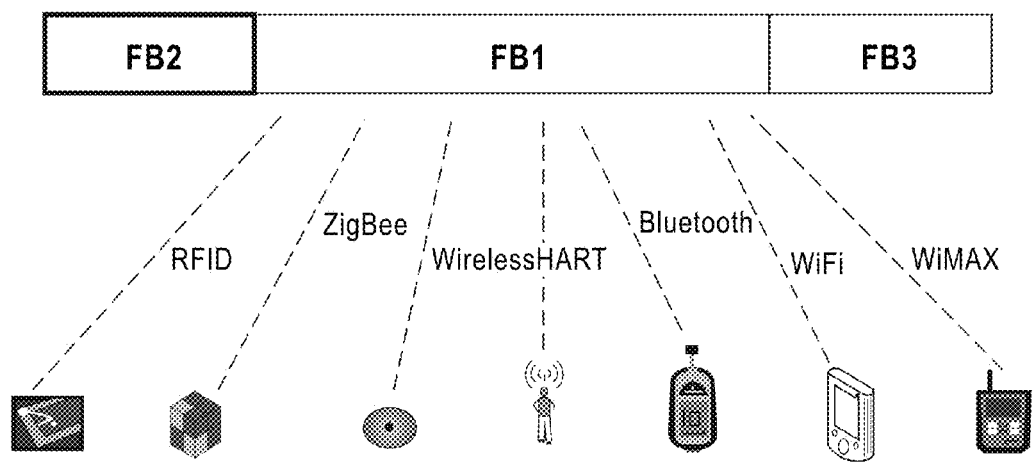
FIG. 1 illustrates a schematic diagram of an environment in which the present invention may be practiced.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

The flowcharts and block in the figures illustrate the system, methods, as well as architecture, functions and operations executable by a computer program product according to the embodiments of the present invention. In this regard, each block in the flowcharts or block may represent a module, a program segment, or a part of code, which contains one or more executable instructions for performing specified logic functions. It should be noted that, in some alternative implementations, the functions noted in the blocks may also occur in a sequence different from what is noted in the drawings. For example, two blocks shown consecutively may be performed in parallel substantially or in an inverse order. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

Hereinafter, the principle and spirit of the present invention will be described with reference to various exemplary embodiments. It should be understood that provision of these embodiments is only to enable those skilled in the art to better understand and further implement the present invention, not intended for limiting the scope of the present invention in any manner.

Hereinafter, various embodiments of the present invention will be described in detail with reference to the drawings.

FIG. 1 illustrates a schematic diagram of an environment in which various embodiments of the present invention may be practiced. This figure illustrates three radio frequency bands FB1, FB2, and FB3, wherein frequency band FB1 represents an open radio frequency band, for example, a 2.4 GHz central frequency point.

As illustrated by the dotted lines that connect the frequency band Fb1 and various wireless devices, the radio frequency band FB1 is open to a plurality of wireless devices in different standards; in other words, the wireless devices in different standards may use an open radio frequency band FB1. For example, a mobile phone 101 in a WiMAX standard may use the radio frequency band FB1 to share frequencies on the same bandwidth resource with other wireless devices.

Figure 2:
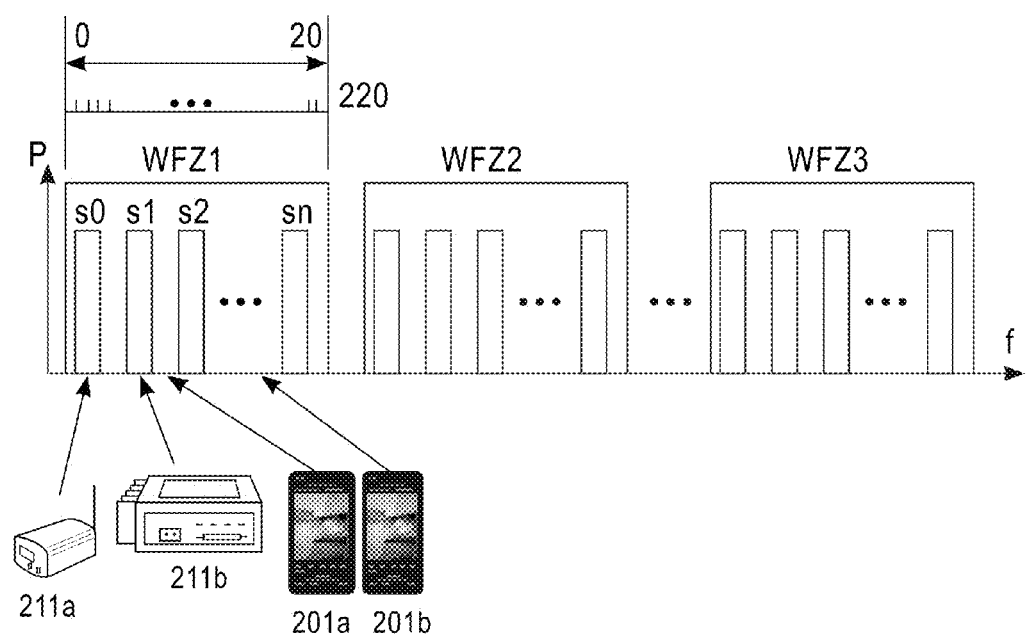
FIG. 2 illustrates a schematic diagram of another environment in which the present invention may be practiced.

FIG. 2 illustrates a schematic diagram of another environment in which various embodiments of the present invention may be practiced. In the two-dimension coordinate system as illustrated in FIG. 2, the horizontal axis f represents frequency scope, and the longitudinal axis P indicates the energy level of the communication signal or the intensity of wireless signal.

Figure 3:
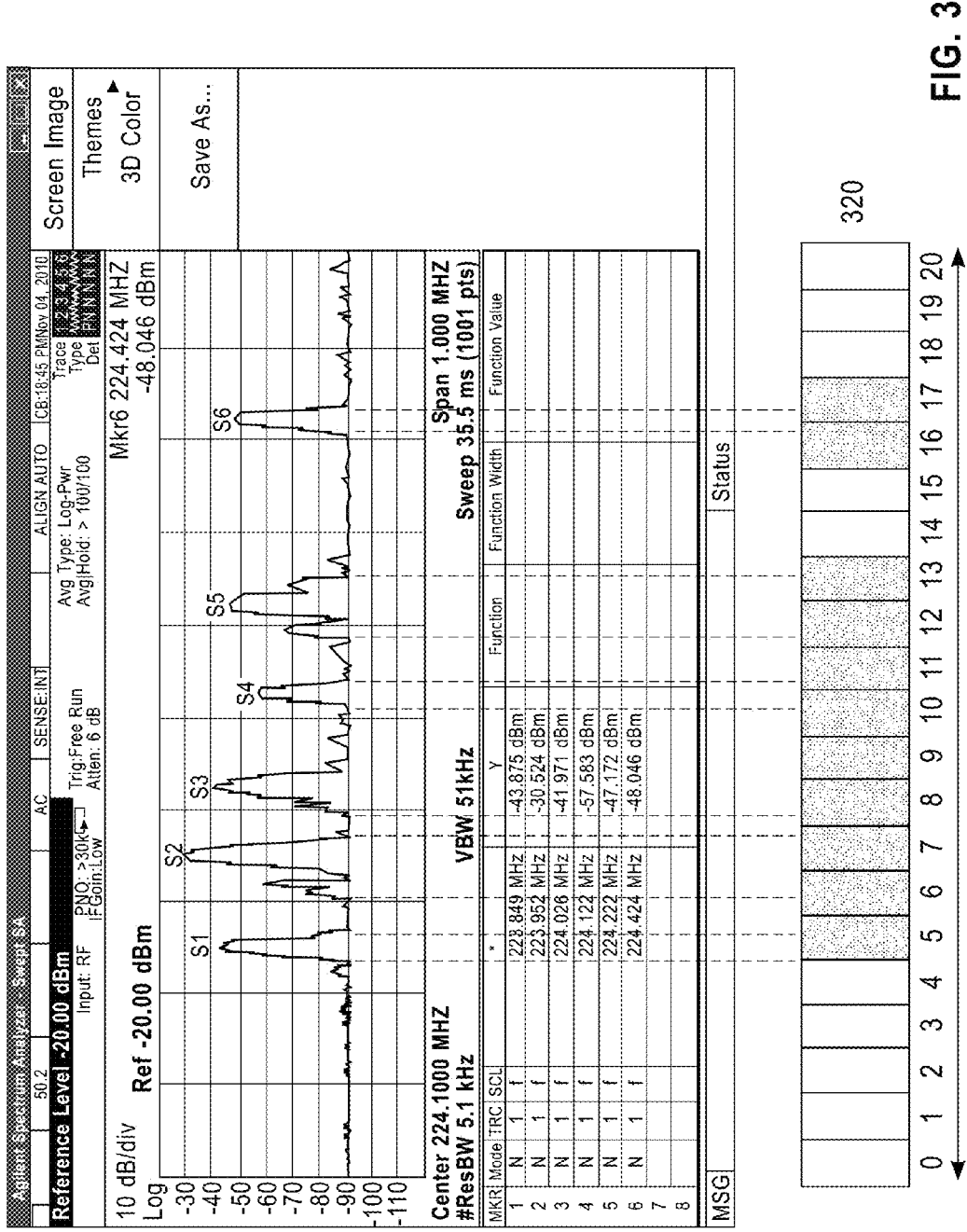
FIG. 3 illustrates a schematic diagram of a result of detecting a wireless signal intensity distribution within a radio frequency band.

The dotted-line block in the two-dimension coordinate system indicates a working frequency zone. The working frequency zone indicates the radio frequency band or frequency scope where the wireless communication system is located when performing communication and may be pre-assigned. For example, a licensed frequency band is just a pre-assigned working frequency zone. FIG. 3 exemplarily illustrates three working frequency zones WFZ1, WFZ2, and WFZ3.

Vertical bars in the dotted-line blocks represent the wireless signals generated by a wireless communication system that works in the working frequency zone. The width and height of vertical bars represent the frequency scope occupied by the wireless signals and the intensity of the wireless signals, respectively. As illustrated in the figure, for example, in the working frequency zone WFZ1, there are wireless signals S0, S1, S2, . . . , Sn, which occupy different frequency scopes, respectively, for example, f0, f1, . . . , fn.

The graph indicated by the reference sign 220 in FIG. 2 represents that the working frequency zone WFZ1 or radio frequency band may be divided into 21 frequency subbands (subband 0 to subband 20). Regarding dividing the radio frequency band, it will be detailed hereinafter.

FIG. 2 illustrates 4 wireless devices 211a, 211b, 201a, and 201b. The arrow starting from the wireless device 211a points towards signal S0, which indicates that the signal S0 is a signal that is generated by the wireless device 211a within the frequency scope f0; similarly, the signal S1 is a signal that is generated by the wireless device 211b within the frequency scope f1. In other words, frequency ranges f0 and f1 are occupied by the wireless devices 211a and 211b, respectively. Similarly, WFZ1 has other frequency ranges f2, . . . , fn that are occupied by other known or unknown wireless systems.

The wireless devices 201a and 201b in FIG. 2, which are orthogonal frequency-division multiplexing OFDM-based wireless devices, are also assigned with the working frequency zone WFZ1. OFDM is a widely applied technology for a wireless communication system, the main thought of which is: dividing a channel into a plurality of orthogonal subbands, converting the high-speed data signals into parallel low-speed sub-data streams to be modulated on each subband for transmission. In other words, with the OFDM-based system, a frequency range may be divided into a plurality of sub-frequency ranges or subbands, such that the base station and the wireless device to which the system belongs may transmit data over the subbands.

As illustrated in FIG. 2, the arrow starting from the OFDM-based wireless device 201a points to the gap between the frequency ranges f1 and f2, which indicates that when the f0, f1, . . . , fn of WFZ1 are occupied, the wireless device 201a may be accessed via an opportunistic spectrum, may use an idle frequency range between frequency ranges f1 and f2, namely, unoccupied frequency range; similarly, the arrow starting from the OFDM-based wireless device 201b indicates that the wireless device 201b may use the idle frequency range between f2 and fn.

The wireless devices 201a and 201b are allowed to use the idle frequency range in the working frequency zone WFZ1, such that the utilization rate of the radio spectrum resources may be improved.

In the scenario as illustrated in FIG. 2, the wireless signals S0, S1 and other signals S2, . . . , Sn as generated by the wireless devices 211a and 211b are signals generated by other systems from the perspective of the OFDM-based wireless device such as wireless device 201a, which belong to interference signals. In order to effectively perform the opportunistic access, the wireless device 201a needs information about distribution of interference signals in the radio frequency band WFZ1, so as to avoid the interference signals or inhibit the in-band interference.

Therefore, the present invention provides a method of sharing frequencies for the OFDM-based wireless communication system. Hereinafter, various embodiments according to the method of the present invention will be described.

Figure 4:
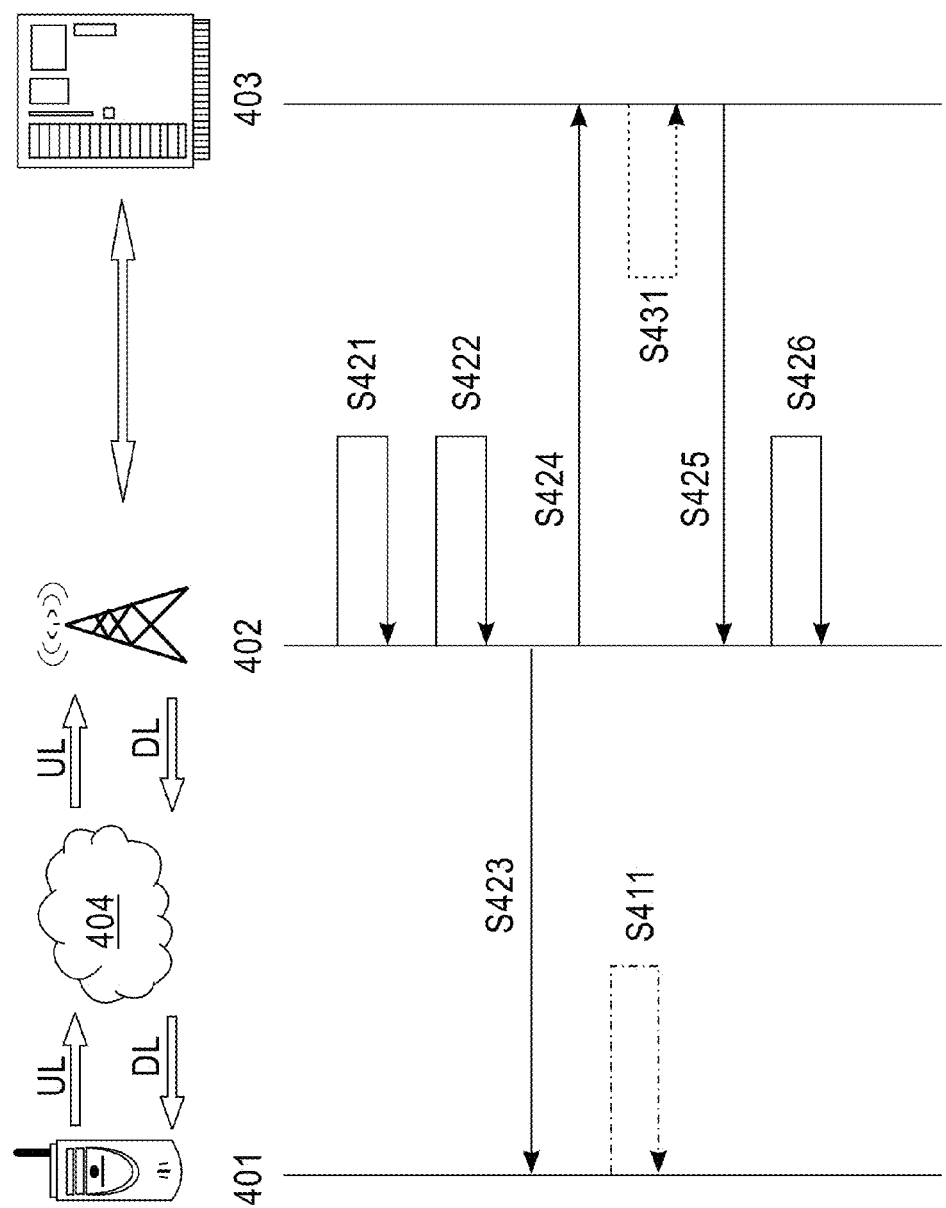
FIG. 4 illustrates a flowchart of one embodiment according to a method of the present invention.

Referring to FIG. 4, it illustrates a flowchart of one embodiment according to the method of the present invention.

FIG. 4 exemplarily illustrates a wireless device or mobile device 401, a base station 402, and a management server 403 that may communicate with the base station 402.

The base station 402 and corresponding mobile device 401 are components of the OFDM-based wireless communication system. The base station 402 and the mobile device 401 communicate via a wireless network 404 and work in a radio frequency band.

The radio frequency band where the base station 402 and the mobile device 401 work is assigned by the management server 403 upon initialization of the wireless communication system. The management server 403 may manage a plurality of base stations (not shown in the figure), comprising assigning different radio frequency bands for different base stations, for example, the radio frequency band FB1 as illustrated in FIG. 1, or working frequency zones WFZ1, WFZ2, or WFZ3 as illustrated in FIG. 2.

For ease of depiction, hereinafter, suppose the radio frequency band where the base station 402 and the mobile device 401 work is the working frequency zone WFZ1 as illustrated in FIG. 2.

The communication between the mobile device 401 and base station 402 is conducted in accordance with the manner as prescribed in corresponding standards. FIG. 4 illustrates that the mobile device 401 sends an uplink frame (UL-Frame) to the base station over the uplink UL (Up-Link), and the base station 402 sends a downlink frame (DL-Frame) to the mobile device 401 over the downlink (Down-Link). The details on encoding, sending, receiving, and decoding the uplink and downlink frames and so on belong to the scope of prior art, which are not to be improved by the present invention and are thus omitted here.

It should be noted that one base station 402 in the wireless communication system may manage a plurality of mobile devices. Thus, although FIG. 4 only illustrates one mobile device 401, it should be understood that the mobile device 401 represents at least one of the plurality of mobile devices that may be managed by the base station 402.

Various embodiments of the present invention relate to the operation of the mobile device 401, the operation of the base station 402, and the operation of the management server 403, which are represented by different arrows in FIG. 4. For example, the dotted-line arrow S411 represents the operation of the mobile device 401; solid-line arrows S421, S422, S423, S424, S425, and S426 represent the operation of the base station 402; and the dotted-line arrow S431 indicates the operation of the management server 403.

As illustrated above, suppose, after initialization, the radio frequency band where the base station 402 and the mobile device 401 work is the working frequency zone WFZ1 as illustrated in FIG. 2.

A method of sharing frequencies in an orthogonal frequency-division multiplexing OFDM-based wireless communication system according to the present invention, comprising steps of:

At step S421, the interference signal in the radio frequency band is detected.

Detecting the interference signal in the radio frequency band may be performed upon initialization of the system, and may be periodically or regularly performed after the initialization. The radio spectrum detection technology that is widely adopted in the prior art may be used to detect the spectrum usage in the radio frequency band or working frequency zone WFZ1 where the base station 402 works, thereby detecting the interference signal.

It should be noted that the specific technical content of detecting the interference signal has no direct relationship with the present invention and thus will not be detailed here. One important aspect of the present invention is how to represent the detection result.

Hereinafter, how to utilize the result of detecting an interference signal is illustrated with reference to FIG. 3.

FIG. 3 illustrates the results of detecting a wireless signal intensity distribution in a radio frequency band. The upper portion of FIG. 3 shows a snap shot of wireless signals detected in a radio frequency band. As illustrated in the figure, the central frequency point of the radio frequency band is 224.1 MHz with a width of 1 MHz. The 6 wireless signals S1, S2, S3, S4, S5, and S6 as shown in the snap shot indicate 6 interference signals that are located in different frequency ranges. The wireless signals S1, S2, S3, S4, S5, and S6 are generated by other systems, for example known or unknown systems such as the wireless devices 211a and 211b as illustrated in FIG. 2.

Detection of interference signals may be performed by an individual detection means, for example, a radio spectrum detector, or performed by a base station 402 integrated with radio spectrum detection techniques.

According to one embodiment of the present invention, the base station 402 may be used to detect the interference signal in the radio frequency band.

The base station 402 may, based upon the interference signal, avoids the frequency range where the interference signal is located.

According to one embodiment of the present invention, the base station 402 may periodically detect the interference signal within the radio frequency band in a certain time interval.

Returning to FIG. 4, at step S422, the base station 402 sets the interference indication information in a control header of a downlink frame to be sent to the mobile device 401.

The interference indication information indicates the frequency range that is occupied by the interference signal in the radio frequency band.

To those skilled in the art, for the detection result as given in the snap shot in FIG. 3, the interference indication information may be represented in various manners, i.e., which frequency ranges in the radio frequency band have interference signals.

According to one embodiment of the present invention, the base station 402 may divide the radio frequency band into a plurality of subbands and identify, among the plurality of subbands, one or more subbands at which the interference signal is detected, thereby generating the interference indication information. This process may be illustrated in FIG. 3.

With reference to FIG. 3, as illustrated, the entire radio frequency band in the upper snap shot in FIG. 3 is divided into a plurality of subbands 320.

The number of subbands may be determined as appropriate when implementing the present invention. In the embodiment as illustrated in FIG. 3, a plurality of subbands 320 include 21 subbands, namely, subband 0, subband 1, . . . , subband 20. However, the present invention is not so limited. For example, the radio frequency band may also be divided into 42 subbands. Those skilled in the art should understand that the more the number of subbands is, the more accurate the indicated interference indication information is.

The dotted lines in FIG. 3 further show that the interference signal S1 falls into the subband 5, the interference signal S2 falls into the subbands 6 and 7, the interference signal S3 falls into the subbands 8 and 9, the interference signal S4 falls into the subbands 10 and 11, the interference signal S4 falls into the subbands 12 and 13, and the interference signal S6 falls into the subbands 16 and 17.

Various kinds of encoding manners may be used to indicate the above information. A simple encoding manner is using bitmap. For example, the following bitmap 1 may be employed to indicate the interference signal as illustrated in FIG. 3.

| Bitmap 1 |
| --- |
| bit   0 1 2 3 4 5 6 7 8 9 1 1 1 1 1 1 1 1 1 2 |
|                           0 1 2 3 4 5 6 7 8 9 0 |
| value 0 0 0 0 0 1 1 1 1 1 1 1 1 1 0 0 1 1 0 0 0 |

The 21 bits 0, 1, . . . , 20 in the bitmap 1 represent the 21 subbands 0, 1, . . . , 20, respectively; and the value for each bit represents whether the subband represented by the bit has the interference signals. For example, the values "1" for bits 5, 6, 7, 8, 9, 10, 11, 12, 13, 16, 17 represent that the subbands 5, 6, 7, 8, 9, 10, 11, 12, 13, 16, and 17 have the interference signals, the values "0" for bits 0, 1, 2, 3, 4, 14, 15, 18, 19, and 20 represent that the subbands 0, 1, 2, 3, 4, 14, 15, 18, 19, and 20 have no interference signal. Such a bitmap may act as interference indication information for indicating which frequency ranges in the radio frequency band are occupied by other systems.

The above bitmap is merely a simple encoding manner for representing the interference indication information. Apparently, the present invention is not limited thereto. As illustrated above, those skilled in the art may use any other encoding manners to represent which subbands are occupied, i.e., the interference indication information.

According to the method of the present invention, the base station 402 sets the interference indication information in the control header of a downlink frame to be sent to the mobile device.

These inventors find that in a wireless communication system under many standards, for example, a WiMAX system and an LTE system, there are always reserved bits in the control header of a downlink frame; thus, the reserved bits in the control header may be advantageously utilized to set the interference indication information.

According to one embodiment of the present invention, the wireless communication system to which the base station 402 belongs is a system that complies with the WiMAX standard. In this case, the control header of the downlink frame at step S422 is a forward control header FCH of the downlink frame that complies with WiMAX standard.

Hereinafter, specific embodiments of setting the interference indication information in the control header of a downlink frame that complies with the WiMAX standard will be illustrated in FIGS. 5 and 6.

Figure 5:
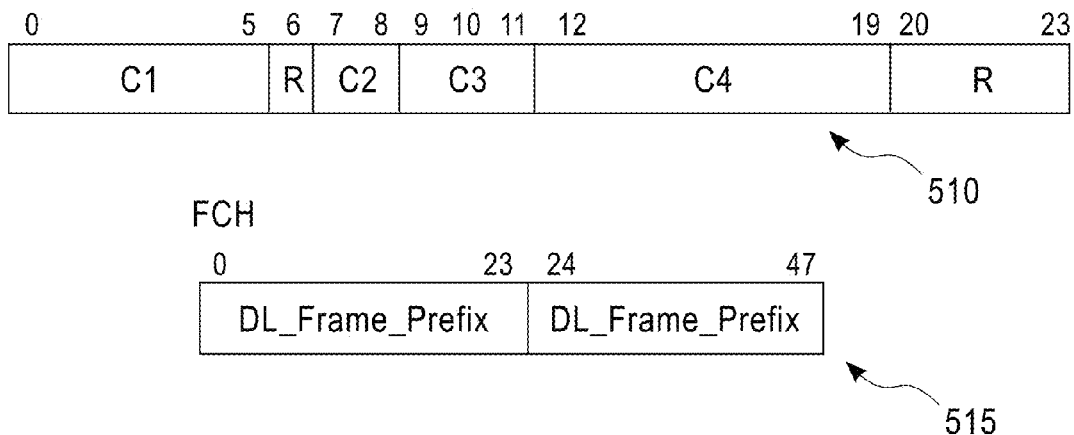
FIG. 5 schematically illustrates the data structure of FCH in a downlink frame.

FIG. 5 schematically illustrates the composition of the forward control header FCH of the downlink frame that complies with the WiMAX standard.

As illustrated in the figures, the downlink frame prefix (DL_Frame_Prefix) 510 in the WiMAX standard is the data structure that is sent at the start of each frame. A downlink frame prefix 510 has 24 bits, wherein bits 0-5, bits 7-8, bits 9-11, and bits 12-19 comprise control data C1, C2, C3, and C4, respectively, and bit 6 and bits 20-23 are reserved bits R.

Here, it should be noted that the specific contents of the control data C1, C2, C3, and C4 have no direct relationship with the present invention, which are thus not detailed here so as to prevent unnecessary interference with reading and understanding of relevant content.

Two DL_Frame_Prefixes formulate a forward control header FCH 515 in the downlink frame. Thus, FCH is a field comprising 48 bits, where the first 20 bits have comprised control data C1, C2, C3, and C4 of the DL_Frame_Prefix. It is to guarantee the correctness and reliability of transmitting DL_Frame_Prefix that the FCH comprises repetitive DL_Frame_Prefix.

According to the WiMAX standard, one FCH will be repetitively transmitted for four times so as to guarantee a successful transmission.

Figure 6:
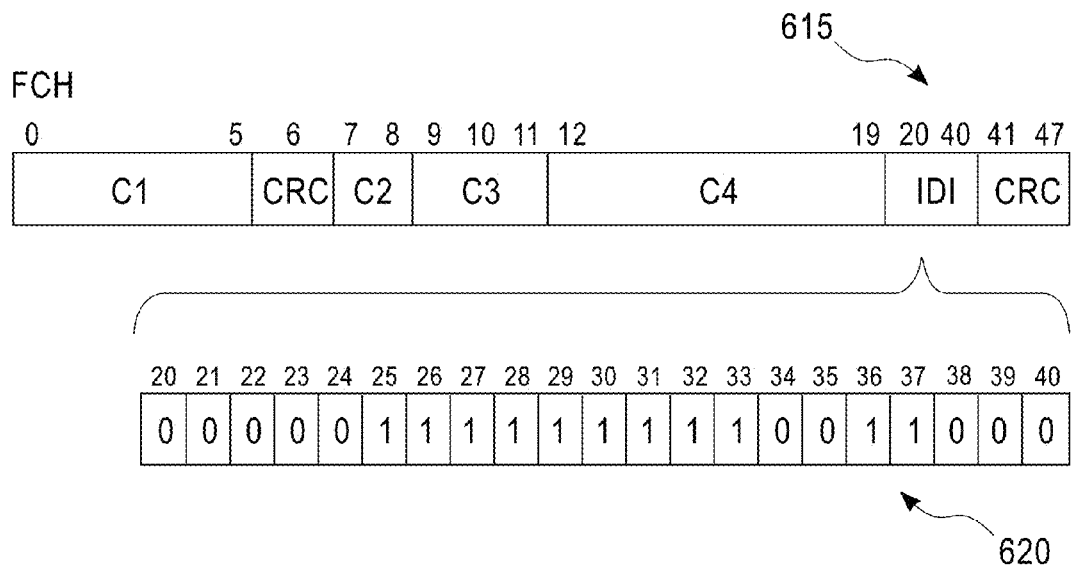
FIG. 6 schematically illustrates a modified FCH according to one embodiment of the present invention.

FIG. 6 schematically illustrates a modified FCH according to one embodiment of the present invention.

As illustrated in FIG. 6, according to one embodiment of the present invention, the FCH may be modified such that the modified FCH 615 also comprise 48 bits, wherein the first 20 bits also comprise control data C1, C2, C3, and C4 that are completely identical to the DL_Frame_Prefix 510 as illustrated in FIG. 5.

Compared with the standard FCH 515 as illustrated in FIG. 5, the 21-bit field IDI formed by bits 20-40 in the modified FCH 615 is for indicating the interference indication information; bit 6 and bits 41-47 are for parity check CRC so as to guarantee the accuracy and reliability of the modified FCH 615, thereby further guaranteeing the accuracy and reliability of the control data C1, C2, C3, and C4 comprised in the modified FCH 615. The modified FCH 615 is still repetitively transmitted for four times.

According to one embodiment of the present invention, a simple and concise manner may be employed to set the interference indication information in the 21-bit field IDI of the modified FCH 615, namely placing the content of bitmap 1 as illustrated above into the field IDI, as indicated by the reference sign 620.

According to one embodiment of the present invention, the radio frequency band is divided into a plurality of subbands (FIG. 3, 320) at the base station 402, the number of the subbands may be determined based upon the number of available bits in the control header. If the modified FCH 615 has 21 available bits, the embodiments of FIG. 3 correspondingly divide the radio frequency band into 21 subbands so as to match with the 21 available bits; the radio frequency band may also be divided into 42 subbands; correspondingly, each bit in the bitmap as illustrated above represents two neighboring subbands. Of course, the radio frequency bands may also be divided into more subbands. It should be known and selectable to those skilled in the art, which will not be detailed here.

Except for the WiMAX system, the present invention may also be implemented on other OFDM-based wireless communication system. For example, the LTE system is also an OFDM-based wireless communication system. Similar to the WiMAX system, the downlink frame of the LTE system also comprises a control header like FCH, for example, PDCCH (Physical Downlink Control Channel) and PBCH (Physical Broadcast Channel), which also comprises available bits such as reserved bits. Apparently, those skilled in the art would easily set the interference indication information in the available bits of PDCCH and/or PBCH based upon the above depiction on the method of setting the interference indication information in the FCH.

Thus, according to another embodiment of the present invention, if the base station 402 is a base station in a wireless communication system that complies with an LTE standard, the control header of the downlink frame at step S422 is a PDCCH of the downlink frame in compliance with the LTE standard.

Returning to FIG. 4, after setting the interference indication information, at step S423, the base station 402 sends a downlink frame to the mobile device 401, such that the mobile device 401 may, based upon the interference indication information, avoid the frequency range where the interference signal is located.

Hereinafter, with a WiMAX advanced modulation and coding (AMC) pattern as an example in connection with FIG. 7, it is depicted that the mobile device 401 may perform mapping between logic channels and physical channels so as to avoid the frequency range where the interference signal is located from the physical space.

Figure 7:
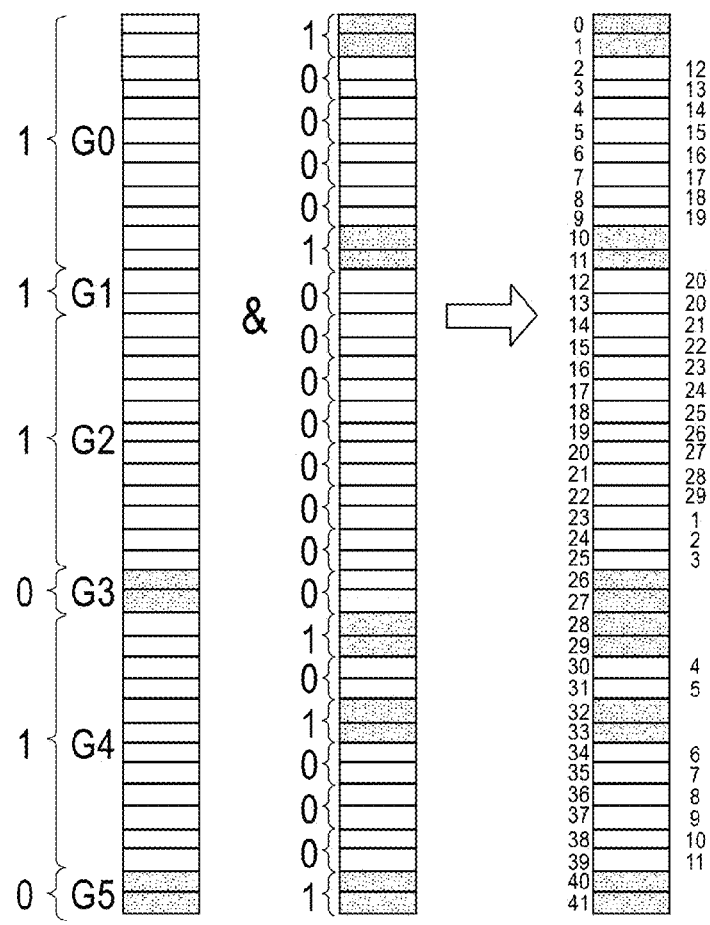
FIG. 7 illustrates a manner of implementing mapping between the logic channel and physical channel according to one embodiment of the present invention.

With reference to FIG. 7, FIG. 7 exemplarily illustrates a manner of implementing mapping between the logic channel and physical channel according to one embodiment of the present invention.

FIG. 7 illustrates three tables (a), (b), and (c). Table (a) indicates an active forbidden channel index, which table divides the 42 subchannels into 6 groups G0, G1, G2, G3, G4, and G5. The values "1" and "0" as illustrated at the left side of table (a) indicate the "FCH group indication" values for the first 6 bits of the FCH, wherein "0" indicate that the corresponding subchannel groups are actively forbidden. As illustrated in the figure, the "FCH group indication" values for group G0, 01, G2, and G4 are 1, while the "FCH group indication" values of groups G3 and G5 are 0, which indicate that the subchannel groups G3 and G5 are actively forbidden. The actively forbidden subchannels are already fixed upon system configuration or initialization and thus will not be automatically adjusted or changed.

Table 7 (b) indicates interference subchannel indexes, which table describes the mapping relationship between the interference subchannels and the physical subchannels in physical space. According to one embodiment of the present invention, for the WiMAX system, a 21-bit field (for example, the 21-bit field 620 in FIG. 6) is used to indicate the interference indication information, for indicating the interference signals or interference subchannels. With the WiMAX advanced modulation and coding (AMC) pattern as an example, the number of subchannels is 42. In this case, each interference indication bit in the 21-bit field represents two AMC subchannels. Values "1" and "0" as illustrated in the left side of table 7 (b) are values of interference indication bits, wherein "1" indicates that the corresponding subchannel is the interference subchannel, i.e., subchannels that have interference signals. As illustrated in the figure, table 7 (b) maps the interference subchannels in the 42 subchannels to physical subchannels 0, 1, 10, 11, 28, 29, 32, 33, 40, and 41.

Table 7 (c) describes the mapping relationship between physical subchannels and logic subchannels. Digits 0 to 41 in the left side of Table 7 (c) indicate physical subchannels, and the digits 0 to 29 in the right side indicate 30 consecutive logical subchannels. The initial location of a logic subchannel may be determined based upon base station configuration parameters (for example Preamble). As illustrated in the figure, the initial logic subchannel 0 corresponds to the physical subchannel 22. Based upon the active forbidden subchannel index in Table 7(a) and interference subchannel index in Table 7 (b), unavailable subchannel index may be generated. Apparently, the unavailable subchannels comprise the active forbidden subchannels 26, 27, 40, and 41 in Table (a) and the interference occupation subchannels 0, 1, 10, 11, 28, 29, 32, 33, 40, and 41 as illustrated in Table (b). When performing mapping between logic subchannels and physical subchannels, the logic subchannels actively avoid the unavailable physical subchannels, so as to form a consecutive logic subchannel space (the logic subchannels 0 to 29) and generate a corresponding correspondence relationship, such that the system may actually avoid the interference channels in the physical space.

Further returning to FIG. 4, the reference sign S411 in the figure indicates that the mobile device 401, after receiving the downlink frame from the base station 420, decodes the downlink frame according to the existing standard. If the control header of the decoded downlink frame contains the interference indication information, then the mobile device 401 avoids the interference signal based on the interference indication information. For example, the interference indication information indicates that the subbands 5-13, 16, and 17 as illustrated in FIG. 3 have been occupied by other wireless system, and then the frequency ranges where the subbands 5-13 and 16-17 are located are avoided.

As indicated by the reference sign S424, according to one embodiment of the present invention, after the base station 402 detects the interference signal in the radio frequency band (S421), it reports the interference signal to the management server 403.

The management server 403 may perform corresponding statistical analysis based upon the information such as interference information, spectrum utilization, and interference condition as sent from the base station 402, thereby forming historical information. Further, the management server 403 may determine the spectrum utilization pattern and interference pattern based upon the historical information, so as to adjust the working frequency and detection cycle of the base station and more accurately reflect the spectrum utilization.

As indicated by reference sign S431, the interference signal is used by the management server 403 for identifying the spectrum utilization pattern and interference pattern in the radio frequency band. For example, the management server 403 may store the interference signal received from the base station 402 and the time stamp associated with the interference signal together in a database (not shown), as historical data. The management server 403 may further analyze the spectrum utilization pattern and frequency interference pattern existing in the radio frequency band based upon the historical data. For example, during a certain period of time in one day, the frequency interference is always present in a certain frequency range within the radio frequency band; within a certain period of time in one day, no frequency interference is present in the radio frequency band.

As described above, the management server 403 may manage a plurality of base stations, thus the interference information as reported by other wireless systems may be received in a similar manner, and the spectrum utilization pattern and interference pattern within the radio frequency band where the other wireless systems are located may be identified in a similar manner. Therefore, the management server 403 identifies for a plurality of wireless systems the spectrum utilization patterns and interference patterns within the radio frequency band, respectively.

As indicated above, the management server 403 may assign different radio frequency bands for different base stations. This assignment may be performed upon initialization of the base station. For example, at the start of network access of the base station 402, the working frequency zone WFZ1 is assigned for the base station 402; or, after the base station works for a period of time, the base station is indicated to switch the radio frequency band. For example, after the base station 402 works for a period of time at the working frequency zone WFZ1, the management server 403 instructs the base station 402 to switch the working frequency zone from WFZ1 to WFZ2. The report about the interference signal received by the management server 403 from the base station and the spectrum utilization pattern and the interference pattern as identified in respective radio frequency bands may act as a basis for the management server 403 to assign radio frequency bands to the base station 402.

As indicated by the reference sign S425, according to one embodiment of the present invention, the base station 402 may receive frequency parameters and/or periodic parameters from the management server.

As indicated by the reference sign S426, the base station 402 may switch the working frequency zone from the radio frequency band to another radio frequency band based upon the frequency parameters; in addition or alternatively, the base station 401 may detect the channels that are currently occupied by other systems in the radio frequency bands according to a time interval indicated by a periodic parameter.

As described above, the frequency and periodical parameters are determined by the management server based upon the identified spectrum utilization pattern and interference pattern.

What are described above are various embodiments of a method of sharing frequencies in an orthogonal frequency-division multiplexing OFDM-based wireless communication system according to the present invention. According to the same inventive concept, the present invention further provides an apparatus for sharing frequencies in an orthogonal frequency-division multiplexing OFDM-based wireless communication system.

Figure 8:
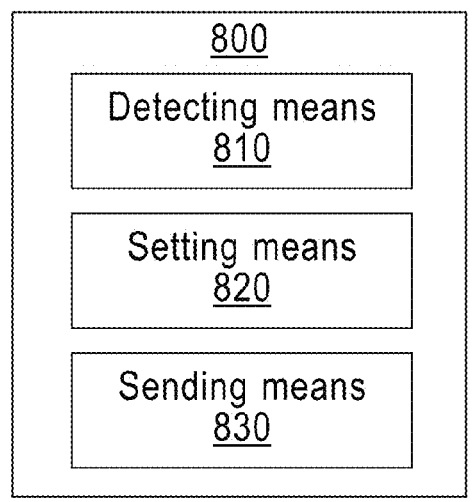
FIG. 8 illustrates a block diagram of an apparatus according to one embodiment of the present invention.

FIG. 8 illustrates a block diagram of an embodiment of the apparatus.

As illustrated in FIG. 8, the apparatus 100 comprises detecting means 810, setting means 820, and sending means 830.

Detecting means 810 is configured to detect an interference signal in the radio frequency band. Setting means 820 is configured to set, based upon the interference signal, interference indication information in a control header of a downlink frame to be sent to the mobile device, the interference indication information indicating a frequency range that is occupied by the interference signal in the radio frequency band. The sending means 830 is for sending the downlink frame to the mobile device, such that the mobile device may, based upon the interference indication information, avoid the frequency range where the interference signal is located.

According to one embodiment of the present invention, the apparatus 800 further comprises a frequency dividing means (not shown) that is configured to divide the radio frequency band into a plurality of subbands and to identify, among the plurality of subbands, one or more subbands at which the interference signal is detected, thereby generating the interference indication information.

According to one embodiment of the present invention, the frequency dividing means determines a number of the subbands in the control header.

According to one embodiment of the present invention, the apparatus 800 further comprises an avoiding means (not shown), for avoiding the frequency range where the interference signal is located based on the interference signal.

According to one embodiment of the present invention, the apparatus 800 further comprises a reporting means (not shown) for reporting the interference signal to a management server, the interference signal being used by the management server for identifying the spectrum utilization pattern and interference pattern of the radio frequency band.

According to one embodiment of the present invention, the apparatus 800 further comprises a switching means (not shown), for switching, based upon a frequency parameter received from the management server, a working frequency zone from the radio frequency band to another radio frequency band, wherein the frequency parameter is determined by the management server based upon the identified spectrum utilization pattern and interference pattern.

According to one embodiment of the present invention, the apparatus 800 further comprises a timing means (not shown), for setting, based upon a time interval indicated by a periodic parameter that is received from the management server, a time for detecting a channel that is currently occupied by other systems in the radio frequency band, wherein the periodic parameter is determined by the management server based upon the identified spectrum utilization pattern and interference pattern.

What is described above is an apparatus for sharing frequencies in an orthogonal frequency-division multiplexing OFDM-based wireless communication system according to the embodiments of the present invention. Because the method of sharing frequencies in an OFDM-based wireless communication system according to various embodiments of the present invention has been described above, in the depiction on the apparatus, the content that is apparently repetitive with the depiction on the method or easily derived from the depiction on the method is omitted.

It should be noted that the above depiction is only exemplary, not intended for limiting the present invention. In other embodiments of the present invention, this method may have more, or less, or different steps, and numbering the steps is only for making the depiction more concise and much clearer, but not for stringently limiting the sequence between each steps, while the sequence of steps may be different from the depiction.

Thus, in some embodiments, the above one or more optional steps may be omitted. Specific implementation of each step may be different from the depiction. All these variations fall within the spirit and scope of the present invention.

The present invention may adopt a form of hardware embodiment, software embodiment or an embodiment comprising hardware components and software components. In a preferred embodiment, the present invention is implemented as software, including, without limitation to, firmware, resident software, micro-code, etc.

Moreover, the present invention may be implemented as a computer program product usable from computers or accessible by computer-readable media that provide program code for use by or in connection with a computer or any instruction executing system. For the purpose of description, a computer-usable or computer-readable medium may be any tangible means that can contain, store, communicate, propagate, or transport the program for use by or in connection with an instruction execution system, apparatus, or device.

The medium may be an electric, magnetic, optical, electromagnetic, infrared, or semiconductor system (apparatus or device), or propagation medium. Examples of the computer-readable medium would include the following: a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CR-ROM), and DVD.

A data processing system adapted for storing or executing program code would include at least one processor that is coupled to a memory element directly or via a system bus. The memory element may include a local memory usable during actually executing the program code, a mass memory, and a cache that provides temporary storage for at least one portion of program code so as to decrease the number of times for retrieving code from the mass memory during execution.

An Input/Output or I/O device (including, without limitation to, a keyboard, a display, a pointing device, etc.) may be coupled to the system directly or via an intermediate I/O controller.

A network adapter may also be coupled to the system such that the data processing system can be coupled to other data processing systems, remote printers, or storage devices via an intermediate private or public network. A modem, a cable modem, and an Ethernet card are merely examples of a currently usable network adapter.

It is to be understood from the foregoing description that modifications and alterations may be made to the respective embodiments of the present invention without departing from the true spirit of the present invention. The description in the present specification is intended to be illustrative and not limiting. The scope of the present invention is limited by the appended claims only.

What is claimed is:

1. An apparatus for sharing frequencies in a long term evolution (LTE) wireless communication system, wherein the apparatus comprising:
   a memory;
   a processor communicatively coupled to the memory for performing;
      detecting an interference signal in the radio frequency band;
      generating, based on the detecting, a bitmap comprising a set of interference indication information, the bitmap being generated separate from downlink frames sent to a mobile device, wherein the bit map comprises a mapping between a plurality of sub-bands in the radio frequency band and a plurality of bits, wherein each bit in the plurality of bits represents a sub-band in the plurality of sub-bands, and wherein each bit is associated with a value indicating one of a presence of an interference on the sub-band and an absence of an interference signal on the sub-band;
      setting, based upon the interference signal, the set of interference indication information in a physical downlink control channel (PDCCH) header of a downlink frame to be sent to a mobile device, the set of interference indication information indicating a frequency range that is occupied by the interference signal in the radio frequency band, wherein the setting further comprises
         identifying a corresponding bit in the PDCCH header for each of the plurality of bits in the bitmap, where each of the corresponding bits in the PDCCH header is an unassigned reserved bit; and
         adding, based on the identifying, the value associated with each of the plurality of bits to the corresponding bit identified in the PDCCH header; and
      sending the downlink frame to the mobile device, such that the mobile device, based upon the set of interference indication information, avoids the frequency range where the interference signal is located.

2. The apparatus according to claim 1, further comprising: dividing the radio frequency band into a plurality of sub-bands, and identifying, among the plurality of subbands, one or more subbands at which the interference signal is detected, thereby generating the interference indication information.

3. The apparatus according to claim 2, wherein a number of the subbands is determined based upon a number of available bits in the control header.

4. An apparatus for sharing frequencies in a long term evolution (LTE) wireless communication system, wherein the apparatus comprising:
   a memory;
   a processor communicatively coupled to the memory for performing;
      detecting an interference signal in the radio frequency band;
      generating, based on the detecting, a bitmap comprising a set of interference indication information, the bitmap being generated separate from downlink frames sent to a mobile device, wherein the bit map comprises a mapping between a plurality of sub-bands in the radio frequency band and a plurality of bits, wherein each bit in the plurality of bits represents a sub-band in the plurality of sub-bands, and wherein each bit is associated with a value indicating one of a presence of an interference on the sub-band and an absence of an interference signal on the sub-band;
      setting, based upon the interference signal, the set of interference indication information in a physical broadcast control channel (PBCH) header of a downlink frame to be sent to a mobile device, the set of interference indication information indicating a frequency range that is occupied by the interference signal in the radio frequency band, wherein the setting further comprises
         identifying a corresponding bit in the PBCH header for each of the plurality of bits in the bitmap, where each of the corresponding bits in the PBCH header is an unassigned reserved bit; and
         adding, based on the identifying, the value associated with each of the plurality of bits to the corresponding bit identified in the PBCH header; and
      sending the downlink frame to the mobile device, such that the mobile device, based upon the set of interference indication information, avoids the frequency range where the interference signal is located.

5. The apparatus according to claim 4, further comprising: dividing the radio frequency band into a plurality of sub-bands, and identifying, among the plurality of subbands, one or more subbands at which the interference signal is detected, thereby generating the interference indication information.

6. The apparatus according to claim 5, wherein a number of the subbands is determined based upon a number of available bits in the control header.

7. A computer program product for sharing frequencies in a long term evolution (LTE) wireless communication system, the computer program product comprising: non-transitory storage medium readable by a processing circuit and storing instructions for execution by the processing circuit for:

detecting an interference signal in the radio frequency band;

generating, based on the detecting, a bitmap comprising a set of interference indication information, the bitmap being generated separate from downlink frames sent to a mobile device, wherein the bit map comprises a mapping between a plurality of sub-bands in the radio frequency band and a plurality of bits, wherein each bit in the plurality of bits represents a sub-band in the plurality of sub-bands, and wherein each bit is associated with a value indicating one of a presence of an interference on the sub-band and an absence of an interference signal on the sub-band;

setting, based upon the interference signal, the set of interference indication information in a physical broadcast control channel (PBCH) header of a downlink frame to be sent to a mobile device, the set of interference indication information indicating a frequency range that is occupied by the interference signal in the radio frequency band, wherein the setting further comprises identifying a corresponding bit in the PBCH header for each of the plurality of bits in the bitmap, where each of the corresponding bits in the PBCH header is an unassigned reserved bit; and adding, based on the identifying, the value associated with each of the plurality of bits to the corresponding bit identified in the PBCH header; and sending the downlink frame to the mobile device, such that the mobile device, based upon the set of interference indication information, avoids the frequency range where the interference signal is located.

8. The computer program product according to claim 7, further comprising:

dividing the radio frequency band into a plurality of sub-bands, and identifying, among the plurality of subbands, one or more subbands at which the interference signal is detected, thereby generating the interference indication information.

9. The computer program product according to claim 8, wherein a number of the subbands is determined based upon a number of available bits in the control header.

* * * * *